United States Patent
Liu et al.

(10) Patent No.: US 7,397,795 B2
(45) Date of Patent: Jul. 8, 2008

(54) METHOD AND SYSTEM FOR LABEL-BASED PACKET FORWARDING AMONG MULTIPLE FORWARDING ELEMENTS

(75) Inventors: Hsin-Yuo (York) Liu, Beaverton, OR (US); Puqi (Perry) Tang, Portland, OR (US); Manav Mishra, Hillsboro, OR (US); Sanjay Bakshi, Beaverton, OR (US)

(73) Assignee: Intel California, Santa Clara, CA (US)

( * ) Notice: Subject to any disclaimer, the term of this patent is extended or adjusted under 35 U.S.C. 154(b) by 1002 days.

(21) Appl. No.: 10/373,233

(22) Filed: Feb. 24, 2003

(65) Prior Publication Data
US 2004/0165601 A1 Aug. 26, 2004

(51) Int. Cl.
*H04L 12/28* (2006.01)
(52) U.S. Cl. ...................... 370/389; 370/401
(58) Field of Classification Search ................. 370/328, 370/338, 349, 351, 352, 389, 392, 395, 401
See application file for complete search history.

(56) References Cited

U.S. PATENT DOCUMENTS

| | | | | |
|---|---|---|---|---|
| 5,434,863 A | * | 7/1995 | Onishi et al. | 370/402 |
| 5,905,723 A | * | 5/1999 | Varghese et al. | 370/351 |
| 6,049,524 A | * | 4/2000 | Fukushima et al. | 370/220 |
| 6,052,736 A | * | 4/2000 | Ogle et al. | 709/244 |
| 6,526,056 B1 | * | 2/2003 | Rekhter et al. | 370/392 |
| 6,577,634 B1 | * | 6/2003 | Tsukakoshi et al. | 370/395.31 |
| 6,665,297 B1 | * | 12/2003 | Hariguchi et al. | 370/392 |
| 6,687,247 B1 | * | 2/2004 | Wilford et al. | 370/392 |
| 6,859,842 B1 | * | 2/2005 | Nakamichi et al. | 709/238 |
| 6,987,762 B2 | * | 1/2006 | Shiota | 370/389 |
| 6,990,101 B1 | * | 1/2006 | Chow et al. | 370/392 |
| 7,127,523 B2 | * | 10/2006 | Kotser | 709/238 |
| 7,154,889 B1 | * | 12/2006 | Rekhter et al. | 370/392 |
| 2001/0021189 A1 | * | 9/2001 | Shiota | 370/389 |
| 2003/0063613 A1 | * | 4/2003 | Carpini et al. | 370/401 |
| 2005/0180422 A1 | * | 8/2005 | Boodaghians | 370/389 |
| 2006/0013145 A1 | * | 1/2006 | Boodaghians | 370/249 |

OTHER PUBLICATIONS

Patent Pending. Inventor(s): Putzolu et al. Title: Data Packet Routing. filed Mar. 29, 2000. U.S. Appl. No. 09/538,331.

(Continued)

*Primary Examiner*—Wing Chan
*Assistant Examiner*—Hong Sol Cho
(74) *Attorney, Agent, or Firm*—Blakely, Sokoloff, Taylor & Zafman LLP

(57) ABSTRACT

A method and system for label-based packet forwarding among multiple forwarding elements is described. The system includes a plurality of forwarding elements to forward a data packet from an ingress port at which the data packet is received from a network to an egress port from which the data packet will be transmitted to a next hop in the network and a control element coupled to the plurality of forwarding elements to control the forwarding elements. Each forwarding element has one or more label switch tables with one or entries to label data packets for forwarding along a path from the ingress port of one of the plurality of forwarding elements to the egress port of another of the plurality of forwarding elements.

19 Claims, 6 Drawing Sheets

OTHER PUBLICATIONS

Patent Pending. Inventor(s): Rangarajan et al. Title: Routing Packets Across Multiple Forwarding Elements. filed Jul. 5, 2001. U.S. Appl. No. 09/900,435.

Patent Pending. Inventor(s): Khosravi et al. Title: System and Method of IP Packet Forwarding Across Directly Connected Forwarding Elements. filed Aug. 17, 2001. U.S. Appl. No. 09/932,294.

Patent Pending. Inventor(s): Liu et al. Title: System and Methods for Updating Routing and Forwarding Information. filed Mar. 27, 2002 U.S. Appl. No. 10/109,558.

* cited by examiner

| FEC | in IFs | outgoing Labels | out IFs | Next Hop | TTL Decrement Count | action |
|---|---|---|---|---|---|---|
| 10.10.10/24 | a | La + Lf | x | z | 1 | push |
| ... | ... | ... | ... | ... | ... | ... |
| ... | ... | ... | ... | ... | ... | ... |
| ... | ... | ... | ... | ... | ... | ... |

FTN Table 200

FIG. 2

| Incoming Label | in IFs | outgoing Labels | out IFs | Next Hop | TTL Decrement Count | action |
|---|---|---|---|---|---|---|
| $L_f$ | z | none | f | $NH_f$ | 0 | pop |
| ... | ... | ... | ... | ... | ... | ... |
| ... | ... | ... | ... | ... | ... | ... |
| ... | ... | ... | ... | ... | ... | ... |

ILM Table 300

FIG. 3

Determine a path through one or more of a plurality of forwarding elements from the ingress port of one of the forwarding elements to the egress port of another of the forwarding elements

402

Add one or more entries to label switch tables associated with one or more of the forwarding elements in the path

METHOD AND SYSTEM FOR LABEL-BASED PACKET FORWARDING AMONG MULTIPLE FORWARDING ELEMENTS

BACKGROUND

1. Technical Field

Embodiments of the invention relate to the field of network routing and switching, and more specifically to label-based forwarding of a packet among multiple forwarding elements.

2. Background Information and Description of Related Art

A typical router includes a forwarding element (FE) to forward data packets from an ingress port to an egress port and a control element (CE) to control the forwarding element. If a customer desires more ports or forwarding capability, additional routers need to be purchased. Furthermore, if a forwarding element is upgraded, the whole router needs to be upgraded.

One solution is to separate the forwarding element from the control element. The forwarding element can then be purchased or upgraded independent of the control element. The control element may also be able to control multiple forwarding elements and multiple types of forwarding elements. However, it is desired for the multiple forwarding elements controlled by a control element to act as a single router while forwarding a data packet.

BRIEF DESCRIPTION OF DRAWINGS

The invention may best be understood by referring to the following description and accompanying drawings that are used to illustrate embodiments of the invention. In the drawings:

FIG. 2 is an exemplary FTN table according to an embodiment of the invention.

FIG. 3 is an exemplary ILM table according to an embodiment of the invention.

FIG. 4 is a flow diagram illustrating a method according to an embodiment of the invention.

DETAILED DESCRIPTION

Embodiments of a system and method for label-based packet forwarding among multiple forwarding elements are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
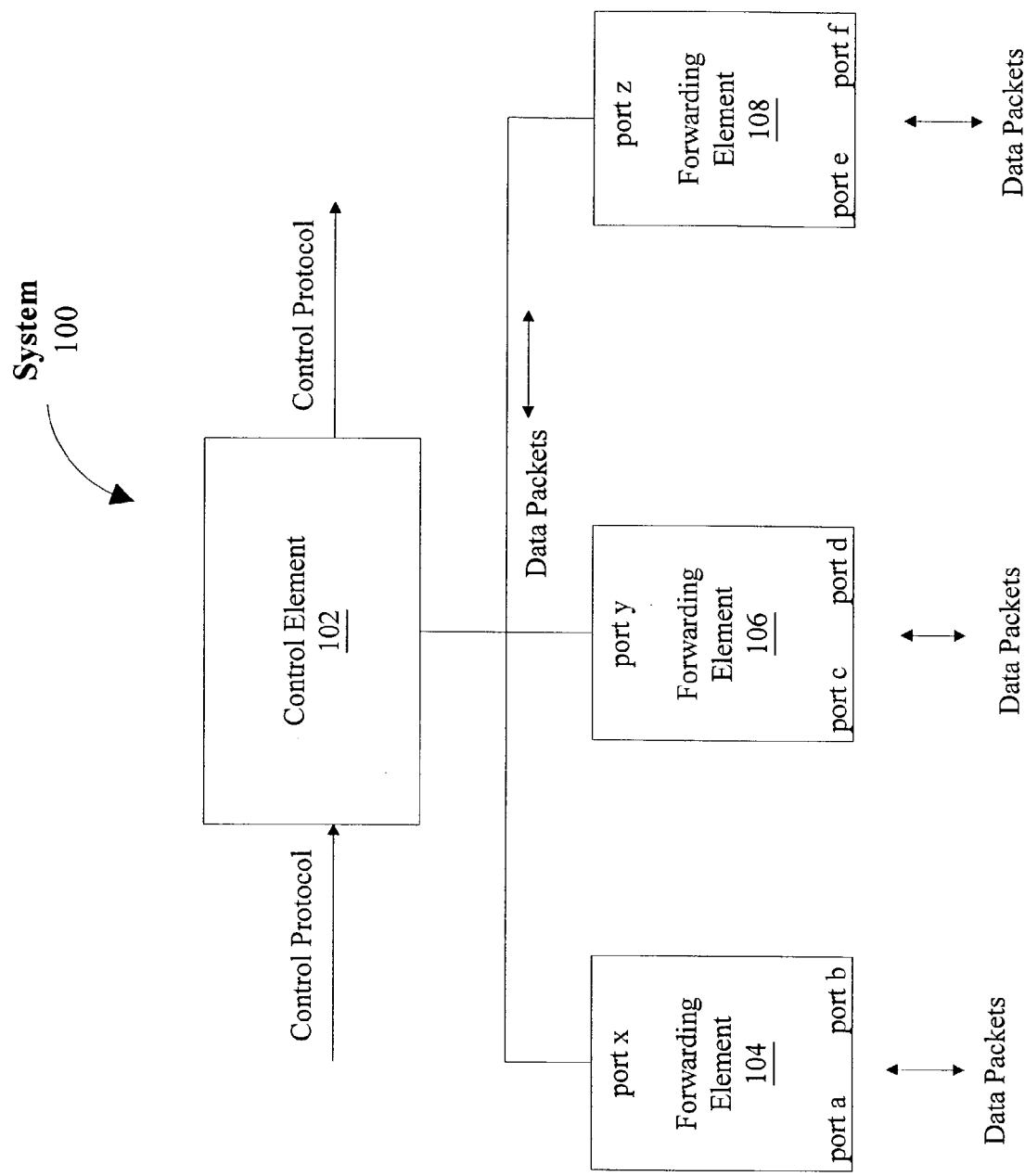
FIG. 1 is a block diagram illustrating one generalized embodiment of a system incorporating the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes a plurality of forwarding elements (FEs), such as 104, 106, or 108, and a control element 102 to control the forwarding elements. The forwarding elements manipulate network traffic, while the control element controls and configures the operations of the forwarding elements. The control element executes different routing protocols and provides routing information to the forwarding elements. The forwarding elements perform operations, such as forwarding, classifying, or filtering, on data packets based on this routing information.

A data packet received at a port on a forwarding element may be transmitted out of the same forwarding element to a network or transmitted out of another forwarding element to the network. In the first case, the data packet may be forwarded internally from an ingress port to an egress port on the same forwarding element. In the latter case, an inter-forwarding label is added to the data packet for forwarding among the plurality of forwarding elements. The inter-forwarding label is stacked on top of any external labels already associated with the data packet. The inter-forwarding label is removed when the data packet is forwarded out of an egress port of one of the plurality of forwarding elements.

In one embodiment, the inter-forwarding label is a Multi-Protocol Label Switching (MPLS) label. In one embodiment, each forwarding element has one or more label switch tables, such as a Forwarding Equivalence Class to Next Hop Label Forwarding Entry (FTN) table or an Incoming Label Map (ILM) table. The inter-forwarding labels are constructed by adding one or more entries to the one or more label switch tables installed in the forwarding elements. The entries may be added as a result of a route update or an external FTN/ILM update. The control element may determine the entries to add to the forwarding elements by parsing a label switch entry, such as a FTN or ILM entry, associated with one of these updates. These added entries to the label switch tables allow the forwarding elements to label data packets for forwarding from an ingress port of one of the forwarding elements to an egress port of another of the forwarding elements, while retaining single-router semantics. In this way, the existence of multiple forwarding elements is hidden from external applications and other network elements in the network. Furthermore, the control element and forwarding element may be purchased and upgraded independent of one another. For example, if a customer decides that more forwarding capability if desired, he/she may purchase an additional forwarding element and add it to the system without purchasing an additional control element. As long as the forwarding element supports label switching, the forwarding element does not have to be purchased from a particular vendor. This allows for greater flexibility and more alternatives for upgrading a network routing/switching system.

In one embodiment, each entry in the FTN table has the following format:

FEC+inIFs→outLabels+outIFs+NextHop+TTLDecrementCount+action, where NHLFE=outLabels+outIFs+NextHop+TTLDecrementCount+action.

Each entry in the ILM table has the following format:

inLabel+inIF→outLabels+outIFs+NextHop+TTLDecrementCount+action, where NHLFE=outLabels+outIFs+NextHop+TTLDecrementCount+action.

The Forwarding Equivalence Class (FEC) could be various criteria, such as a description of the criteria used to determine if a set of data packets is to be forwarded in the same manner along the same label switch path. The incoming interfaces (inIFs) are the ingress ports of the forwarding elements at which a data packet may arrive. The incoming label (inLabel) is a label that is used to compare with the label on top of a data packet's label stack when it arrives at an ingress port of a forwarding element. Collectively, information about the data packet's outLabel, outIFs, next hop, TTL Decrement Count, and action are known as the Next Hop Label Forwarding Entry (NHLFE). In the FTN entry, the combination of the FEC and inIFs map to the NHLFE. In the ILM entry, the combination of the inLabel and inIF maps to the NHLFE.

The outgoing labels (outLabels) are the labels that are pushed or swapped onto a label stack associated with the data packet. These labels may include the inter-forwarding label and/or any labels that the data packet will retain on its way to its next hop. If an inter-forwarding label is pushed onto the label stack, it is stacked on top of any other labels that the data packet will retain on its way to its next network destination. The outgoing interfaces (outIFs) are the egress ports of the forwarding elements from which a data packet may be transmitted. The next hop is the next intermediate destination for the data packet.

The Time to Live (TTL) indicates how many more hops the data packet may travel before it is discarded. The TTL Decrement Count indicates how many hops to deduct from the TTL indicator. For example, when a data packet arrives at the first one of the plurality of forwarding elements, one hop may be deducted from the TTL. However, in order to retain single-router semantics, when the data packet is forwarded to another of the plurality of forwarding elements, there is no deduction to the TTL.

The action specifies one of a plurality of operations to be performed on the label stack. For example, for an incoming packet, a label may be added with a push action. For an outgoing packet, a label may be removed with a pop action. One label may also be swapped for another label. Another action may be swap-push, where a label may be swapped for another label on the top of the label stack and then another label may be pushed onto the stack.

An example will now be discussed for illustrative purposes. In this example, assume that there are two forwarding elements 104 and 108. The forwarding element 104 has one port for incoming data packets, a, and one port for internal routing, x. The forwarding element 108 has one port for outgoing data packets, f, and one port for internal routing, z. Further assume that the following is the original FTN entry to be added by the routing application on top of the control plane: 10.10.10/24+a→La+f+$NH_f$,1+push. This original FTN entry will be parsed, and the entries that are added to the label switch tables of forwarding elements 104 and 108 are determined. The following FTN entry will be added to the FTN table of forwarding element 104: 10.10.10/24+a→[La+Lf]+x+z+1+push. The following ILM entry will be added to the ILM table of the forwarding element 108: Lf+z→none+f+$NH_f$+0+pop. An example of the resulting entry added to the FTN table for forwarding element 104 is shown in FIG. 2. An example of the resulting entry added to the ILM table for forwarding element 108 is shown in FIG. 3.

FIG. 2 illustrates an exemplary FTN table 200 according to an embodiment of the invention. The FTN table 200 has a plurality of fields. Field 202 specifies the FEC. In the example shown, the FEC is the network address 10.10.10.0 and 24 is the number of bits representing the network address as a prefix. Field 204 specifies the incoming interfaces (inIFs). In the example shown, the incoming interface for forwarding element 104 is its ingress port a. Field 206 specifies the outgoing labels. In this example, two labels will be pushed onto the data packet's label stack. The first label to be pushed onto the label stack is the label that the data packet will retain on its way to its next network destination (label La). The second label to be pushed onto the label stack is the inter-forwarding label Lf. The inter-forwarding label is pushed onto the label stack on top of the label La. The inter-forwarding label labels the data packet for forwarding among the multiple forwarding elements and will be popped from the label stack before the data packet is transmitted to its next network destination. Field 208 specifies the outgoing interfaces (outIFs). In this example, the outgoing interface for forwarding element 104 is port x. Field 210 specifies the next hop. The next hop for the data packet is port z of forwarding element 108. Field 212 specifies the TTL Decrement Count. Since this is the first forwarding element that the data packet arrives at, one hop may be deducted from the TTL, so the TTL Decrement Count is 1. Field 214 specifies the action to be taken on the label stack. In this example, the two outgoing labels described above will be pushed with the "push" action onto the data packet's label stack.

FIG. 3 illustrates an exemplary ILM table 300 according to an embodiment of the invention. The ILM table 300 has a plurality of fields. Field 302 specifies the incoming label. At forwarding element 108, the incoming label is the inter-forwarding label Lf that was pushed onto the data packet's label stack at forwarding element 104. Field 304 specifies the incoming interfaces (inIFs). The incoming interface for forwarding element 108 is port z. Field 306 specifies the outgoing labels. There are no labels to be pushed onto the data packet's label stack at forwarding element 108. Field 308 specifies the outgoing interfaces (outIFs). The outgoing interface for forwarding element 108 is outgoing port f. Field 310 specifies the next hop. The next hop is the next network destination, $NH_f$, for the data packet. Field 312 specifies the TTL Decrement Count. This is the second forwarding element that the data packet arrives at, and one hop was already deducted from the TTL at forwarding element 104. Therefore, there is no deduction to the TTL at forwarding element 108 in order to retain single-router semantics. Field 314 specifies the action to be taken on the label stack. The inter-forwarding label Lf is popped with the "pop" action from the data packet's label stack. The data packet is then transmitted out of forwarding element 108 to its next network destination $NH_f$.

FIG. 4 illustrates a method for the control path according to one embodiment of the invention. When there is a route update or external FTN/ILM update, inter-forwarding label construction and installation is triggered and entries may be added to the label switch tables of the plurality of forwarding elements. In one embodiment, a label switch entry, such as a FTN or ILM entry, may be parsed. A determination is made as to whether an ingress port and an egress port are located on the same forwarding element. If so, the label switch entry is added to the label switch table of the forwarding element in which the ingress port and the egress port are located. If not, then at 402, a path through one or more of the plurality of forwarding elements from the ingress port of one of the forwarding elements to the egress port of another of the forwarding elements is determined. Then, at 404, one or more entries are added to the label switch tables associated with one or more of the forwarding elements in the path to label data packets for forwarding among the forwarding elements in the path.

In one embodiment, one or more entries are added to FTN tables or ILM tables associated with one or more of the forwarding elements in the path to label data packets for forwarding among the forwarding elements. In one embodiment, a FTN entry is added to the FTN table of each forwarding element in the path in which an ingress port may be located to label data packets for forwarding among the forwarding elements in the path. In one embodiment, an ILM entry is added to the ILM table of each forwarding element in the path in which an egress port may be located to remove the inter-forwarding element label from the data packets before the data packets are transmitted to the next hop in the network.

Once the entries are installed on the forwarding elements, data packets received at the forwarding elements will be labeled for forwarding among the forwarding elements. This data path process is described in greater detail with respect to FIG. 5.

Figure 5:
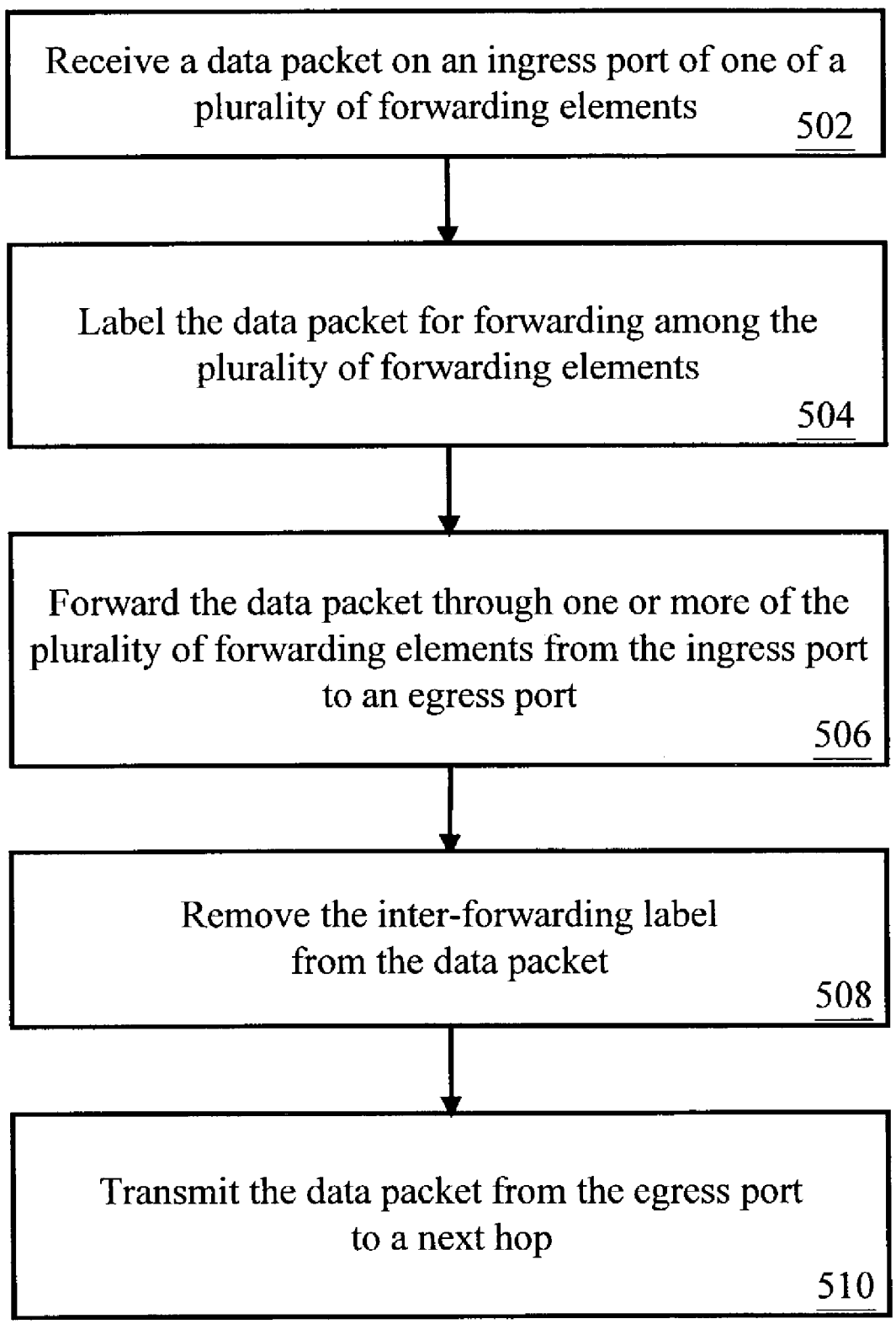
FIG. 5 is a flow diagram illustrating a method according to an embodiment of the invention.

FIG. 5 illustrates a method for the data path according to one embodiment of the invention. At 502, a data packet is received at an ingress port of one of a plurality of forwarding elements. At 504, the data packet is labeled for forwarding among the plurality of forwarding elements. At 506, the data packet is forwarded through one or more of the plurality of forwarding elements from the ingress port at which the data packet was received to an egress port from which the data packet will be transmitted to a next hop. At 508, the inter-forwarding label is removed from the data packet. At 510, the data packet is transmitted from the egress port to the next hop in the network.

In one embodiment, a generic algorithm may be implemented to perform label construction. The generic algorithm derives a generic external FTN update, which contains X FE's, L FTN entries, M incoming interfaces, and N NHLFE in each FTN. An exemplary implementation of this generic algorithm is illustrated by the pseudo code below. Inside the pseudo code, the Topology Manager is a software module providing the forwarding path information from the ingress FE to the egress FE, and the Label Manger is another software module managing the label pool for MPLS labels used for inter-FE forwarding.

```
FOR index1 = external FTN request 0 to L-1
    FOR index = FE 0 to X-1
        Reset FE(index).newftnentry to 0
    END FOR
    FOR index2 = incoming interface 0 to M-1 in FTN(index1)
        iFE = the FE that interface(index2) belongs to
        REPEAT
            Get each FE from FE 0 to X-1
        UNTIL FE == iFE
        IF FE.newftnentry == 0 THEN
            Create an empty mplsFTN entry push to
FE.inEntries link list
        ELSE
            mplsFTN = get the last mplsFTN from
FE. inEntries
list
        END IF
        Convert the incoming interface in mplsFTN to FE's
port
id
    END FOR
    FOR index2 = FE list from 0 to X-1
```

-continued

```
        iFE = FE(index2)
        IF iFE.newftnentry == 0
            CONTINUE
        END IF
        mplsFTN = get the last mplsFTN from iFE.inEntries
list
        Copy FTN(index1).NHLFEList to mplsFTN.NHLFEList
        FOR index3 = mplsFTN.NHLFE from 0 to N-1
            oif =
mplsFTN.NHLFE(index3).outinterface
            oFE the = FE that oif belongs to
            IF iFE == oFE THEN
                CONTINUE
            END IF
            Call Topology Manager to get Path
(outPort,
inPort) from iFE to oFE
            Call Label Manager get InterFE Label
from
mplsFTN.NHLFE(index3).nextHop
                Put the InterFE label on top of the
mplsFTN.NHLFE(index3).outLabel
                mplsFTN.NHLFE(index3).outInterface =
outPort
            REPEAT
                Get each FE from FE 0 to
X-1
            UNTIL FE == oFE
            IF incoming lbl in last FE.newilmentry
of the
FE. eilmentries=InterFE lbl
                CONTINUE
            END IF
            Create new mplsILM and push it into
FE. eilmentries
                mplsILM.incomingLabel = InterFE Label
                mplsILM.incomingInterface = inPort
                FE.newilmentry++;
                Copy mplsFTN.NHLFE(index3) to
mplsILM.NHLFE
                mplsILM.NHLFE.nextHop =
FTN(index1).NHLFE(index3).nextHop
                mplsILM.NHLFE.action = POP
                mplsILM.NHLFE.outgoingInterface =
port (index4)
                mplsILM.NHLFE.ttl = 0
            END FOR
        END FOR
    END FOR
    FOR index = FE 0 to X-1
        Install FE(index).inEntries list into FE(index)'s FTN table
        Install FE(index).eilmentries list into FE(index)'s ILM table
    END FOR
```

For ILM updates, a similar algorithm may be implemented by replacing, in the above code, the incoming FEC with the incoming label. A similar process also works for route updates.

An example will now be discussed for illustrative purposes. In this example, assume that there are three forwarding elements (FEs), as shown in FIG. 1. The first forwarding element 104 has two ports for receiving and transmitting data packets, a and b, and one port for internal routing, x. The second forwarding element 106 has two ports for receiving and transmitting data packets, c and d, and one port for internal routing, y. The third forwarding element 108 has two ports for receiving and transmitting data packets, e and f, and one port for internal routing, z.

Each forwarding element has a FTN table and an ILM table. To construct labels for forwarding data packets among the forwarding elements, entries are added to the FTN and/or ILM tables of the three forwarding elements. These entries allow single router semantics to be retained and allow the existence of the multiple forwarding elements to be hidden from external applications and network elements. The entries may be added as a result of a route update or an external FTN/ILM update. Each FTN entry has the following format:
FEC+inIFs→outLabels+outIFs+NextHop+TTLDecrementCount+action,
where NHLFE=outLabels+outIFs+NextHop+TTLDecrementCount+action.

Each ILM entry has the following format:
inLabel+inIF→outLabels+outIFs+NextHop+TTLDecrementCount+action,
where NHLFE=outLabels+outIFs+NextHop+TTLDecrementCount+action.

Assume that the following is the original external FTN to be added into the label-switching router:

$$\begin{bmatrix} FEC: 10.10.10.0/24 \\ inIFs: a\ b\ c \\ NHLFEs: (L_{NHd}, d, NH_d, 1, \text{Push})\ (L_{NHe}, e, NH_e, 1, \text{Push})\ (L_{NHf}, f, NH_f, 1, \text{Push}) \end{bmatrix}$$

After parsing the above entry, the added entries to the label switch tables of each forwarding element are as follows:

FE 104

FTN $\begin{bmatrix} FEC \\ inIF: a\ b \\ NHLFEs: ([L_a + L_{NHd}], x, y, 1, \text{push})\ ([L_a + L_{NHe}], x, z, 1, \text{push})\ ([L_a + L_{NHf}], x, z, 1, \text{push}) \end{bmatrix}$ ILM None

FE 106

FTN $\begin{bmatrix} FEC \\ inIF: y \\ NHLFEs: (L_a, d, NH_d, 1, \text{push})\ ([L_a + L_{NHe}], y, z, 1, \text{push})\ ([L_a + L_{NHf}], y, z, 1, \text{push}) \end{bmatrix}$ ILM $\begin{bmatrix} L_{NHd} \\ inIF: y \\ NHLFEs\ (\text{Null}, d, NH_d, 0, \text{pop}) \end{bmatrix}$

FE 108

FTN None

Figure 6:
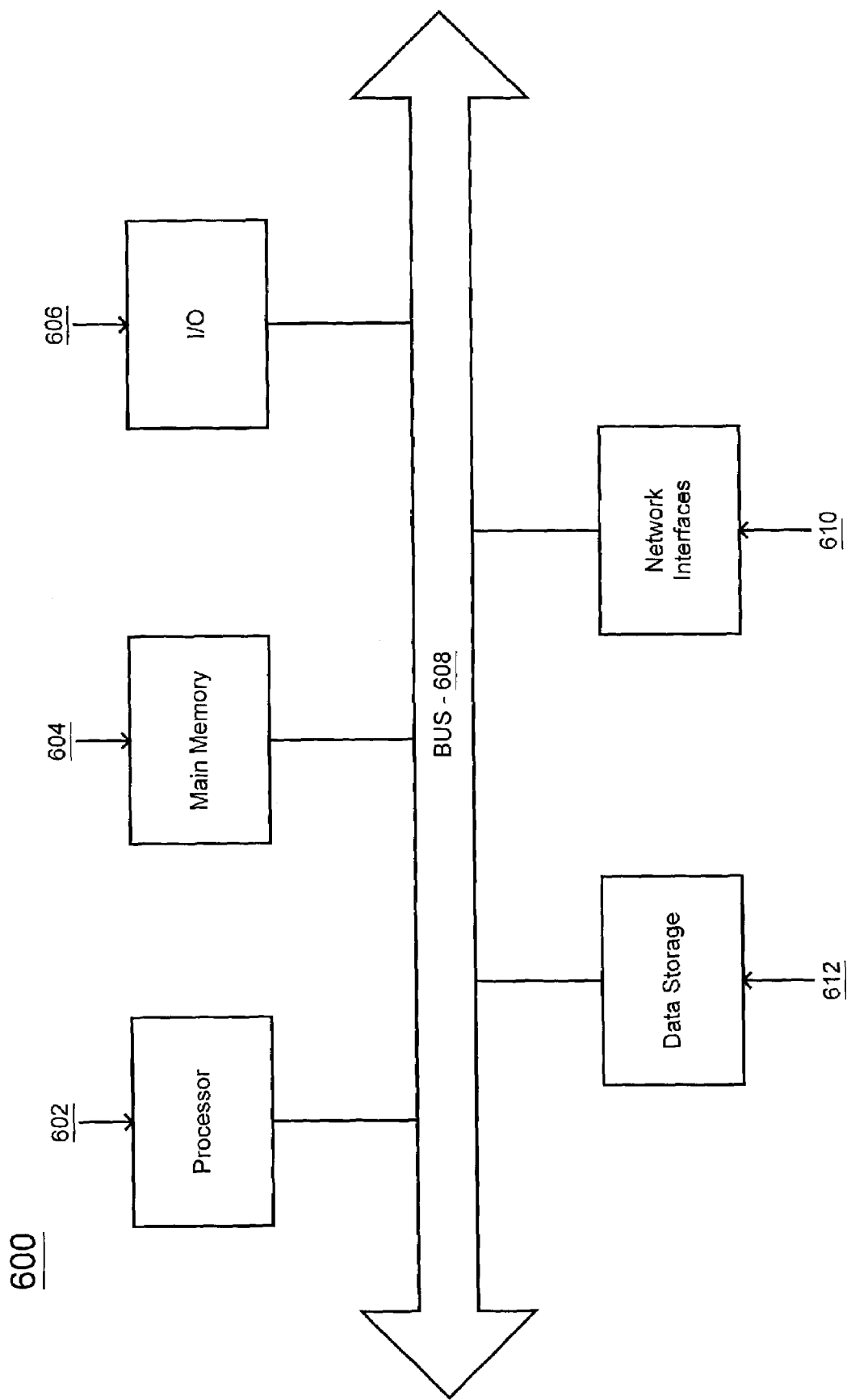
FIG. 6 is a block diagram illustrating a suitable computing environment in which certain aspects of the illustrated invention may be practiced.

ILM $\begin{bmatrix} L_{NHe} \\ inIF: z \\ NHLFEs\ (\text{Null}, e, NH_e, 0, \text{pop}) \end{bmatrix}$ $\begin{bmatrix} L_{NHf} \\ inIF: z \\ NHLFEs\ (\text{Null}, f, NH_f, 0, \text{pop}) \end{bmatrix}$ FIG. 6 is a block diagram illustrating a suitable computing environment in which certain aspects of the illustrated invention may be practiced. In one embodiment, the method for label construction according to the invention may be implemented on a computer system 600 having components 602-612, including a processor 602, a memory 604, an Input/Output device 606, a data storage 612, and a network interface 610, coupled to each other via a bus 608. The components perform their conventional functions known in the art and provide the means for implementing the system 100. Collectively, these components represent a broad category of hardware systems, including but not limited to general purpose computer systems and specialized packet forwarding devices.

It is to be appreciated that various components of computer system 600 may be rearranged, and that certain implementations of the present invention may not require nor include all of the above components. Furthermore, additional components may be included in system 600, such as additional processors (e.g., a digital signal processor), storage devices, memories, and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a plurality of forwarding elements to receive a data packet from a network and to forward the data packet to a next hop in the network; and
a control element coupled to the plurality of forwarding elements to control the forwarding elements and to determine a path through one or more of the plurality of forwarding elements from an ingress port of one of the plurality of forwarding elements to an egress port of another of the plurality of forwarding elements when the ingress port and the egress port are not located on a same forwarding element,
wherein each forwarding element to have one or more label switch tables with one or more entries to label the data packet for forwarding along the path from the ingress port to the egress port from which the data packet is to be transmitted to the next hop in the network, and
wherein each entry in the one or more switch tables specifies deducting one from the Time to Live (TTL) indicator for the data packet when the data packet arrives at a first one of the plurality of forwarding elements and deducting zero from the TTL indicator for the data packet if the data packet is forwarded to another of the plurality of forwarding elements.

2. The apparatus of claim 1, wherein each forwarding element to have one or more label switch tables with one or more entries to label the data packet for forwarding along the path comprises each forwarding element to have a Forwarding Equivalence Class to Next Hop Label Forwarding Entry (FTN) table or an Incoming Label Map (ILM) table with one or more entries to label the data packet for forwarding among the forwarding elements in the path.

3. The apparatus of claim 2, wherein each entry in the FTN table or the ILM table specifies an action to be taken on a label stack.

4. The apparatus of claim 2, wherein each entry in the FTN table or the ILM table specifies one or more incoming interfaces.

5. The apparatus of claim 2, wherein each entry in the FTN table or the ILM table specifies one or more outgoing interfaces.

6. A method comprising:
determining a path through one or more of a plurality of forwarding elements from an ingress port of one of the plurality of forwarding elements to an egress port of another of the plurality of forwarding elements when the ingress port and the egress port are not located on a same forwarding element;
adding one or more entries to label switch tables associated with one or more of the forwarding elements in the path to label data packets for forwarding among the forwarding elements in the path; and
wherein each entry in the one or more switch tables specifies deducting one from the Time to Live (TTL) indicator for the data packet when the data packet arrives at a first one of the plurality of forwarding elements and deducting zero from the TTL indicator for the data packet if the data packet is forwarded to another of the plurality of forwarding elements.

7. The method of claim 6, wherein adding one or more entries to label switch tables associated with one or more of the forwarding elements in the path to label data packets for forwarding among the forwarding elements in the path comprises adding one or more entries to Forwarding Equivalence Class to Next Hop Label Forwarding Entry (FTN) tables associated with one or more of the forwarding elements in the path to label data packets for forwarding among the forwarding elements.

8. The method of claim 7, wherein adding one or more entries to FTN tables associated with one or more of the forwarding elements in the path comprises adding a FTN entry to the FTN table of each forwarding element in the path in which an ingress port may be located.

9. The method of claim 6, wherein adding one or more entries to label switch tables associated with one or more of the forwarding elements in the path to label data packets for forwarding among the forwarding elements in the path comprises adding one or more entries to Incoming Label Map (ILM) tables associated with one or more of the forwarding elements in the path to label data packets for forwarding among the forwarding elements.

10. The method of claim 9, further comprising adding an ILM entry to the ILM table of each forwarding element in the path in which an egress port may be located to remove the inter-forwarding label from the data packets before the data packets are transmitted from the egress port to a next hop in a network.

11. An article of manufacture comprising:
a machine accessible medium encoded with program code when executed by a machine causes the machine to
determine a path through one or more of a plurality of forwarding elements from an ingress port of one of the plurality of forwarding elements to an egress port of another of the plurality of forwarding elements when the ingress port and the egress port are not located on a same forwarding element;
add one or more entries to label switch tables associated with one or more of the forwarding elements in the path to label data packets for forwarding among the forwarding elements in the path;
deduct one from the Time to Live (TTL) indicator for the data packet when the data packet arrives at a first one of the plurality of forwarding elements; and
deduct zero from the TTL indicator for the data packet if the data packet is forwarded to another of the plurality of forwarding elements.

12. The article of manufacture of claim 11, wherein said machine accessible medium encoded with program code when executed by a machine causes the machine to add one or more entries to label switch tables associated with one or more of the forwarding elements in the path comprises a machine accessible medium comprising content that when accessed by a machine causes the machine to add one or more entries to Forwarding Equivalence Class to Next Hop Label Forwarding Entry (FTN) tables associated with one or more of the forwarding elements in the path.

13. The article of manufacture of claim 12, wherein said machine accessible medium encoded with program code when executed by a machine causes the machine add one or more entries to FTN tables associated with one or more of the forwarding elements in the path comprises a machine accessible medium comprising content that when accessed by a machine causes the machine to add a FTN entry to the FTN table of each forwarding element in the path in which an ingress port may be located.

14. The article of manufacture of claim 11, wherein said machine accessible medium encoded with program code when executed by a machine causes the machine to add one or more entries to label switch tables associated with one or more of the forwarding elements in the path comprises a machine accessible medium comprising content that when accessed by a machine causes the machine to add one or more entries to Incoming Label Map (ILM) tables associated with one or more of the forwarding elements in the path.

15. The article of manufacture of claim 14, wherein said machine accessible medium encoded with program code when executed by a machine causes the machine add one or more entries to ILM tables associated with one or more of the forwarding elements in the path comprises a machine accessible medium comprising content that when accessed by a machine causes the machine to add an ILM entry to the ILM table of each forwarding element in the path in which an egress port may be located to remove the inter0forwarding element label from the data packets before the data packets are transmitted from the egress port to a next hop.

16. A method comprising:
   receiving a data packet on an ingress port of one of a plurality of forwarding elements from a network;
   deducting one from the Time to Live (TTL) indicator for the data packet when the data packet is received on the ingress port;
   determining a path for the data packet through one or more of a plurality of forwarding elements from the ingress port of one of the plurality of forwarding elements to an egress port of another of the plurality of forwarding elements when the ingress port and the egress port are not located on a same forwarding element;
   labeling the data packet for forwarding among two or more of the plurality of forwarding elements;
   forwarding the data packet through the two or more of the plurality of forwarding elements from the ingress port at which the data packet was received to the egress port from which the data packet will be transmitted to a next hop in the network;
   deducting zero from the TTL indicator for the data packet when the data packet is forwarded to one of the two or more forwarding elements;
   removing the inter-forwarding label from the data packet; and
   transmitting the data packet from the egress port to the next hop in the network.

17. The method of claim 16, wherein labeling the data packet for forwarding among two or more of the plurality of forwarding elements comprises pushing an inter-forwarding label onto a label stack associated with the data packet.

18. The method of claim 17, wherein removing the inter-forwarding label from the data packet comprises popping the inter-forwarding label from the label stack associated with the data packet.

19. The method of claim 16, wherein labeling the data packet for forwarding among two or more of the plurality of forwarding elements comprises adding a Multi-Protocol Label Switching (MPLS) label to the data packet.

* * * * *